W. H. WILSON.
Improvement in Hand Corn Shellers.
No. 123,319.  Patented Jan. 30, 1872.
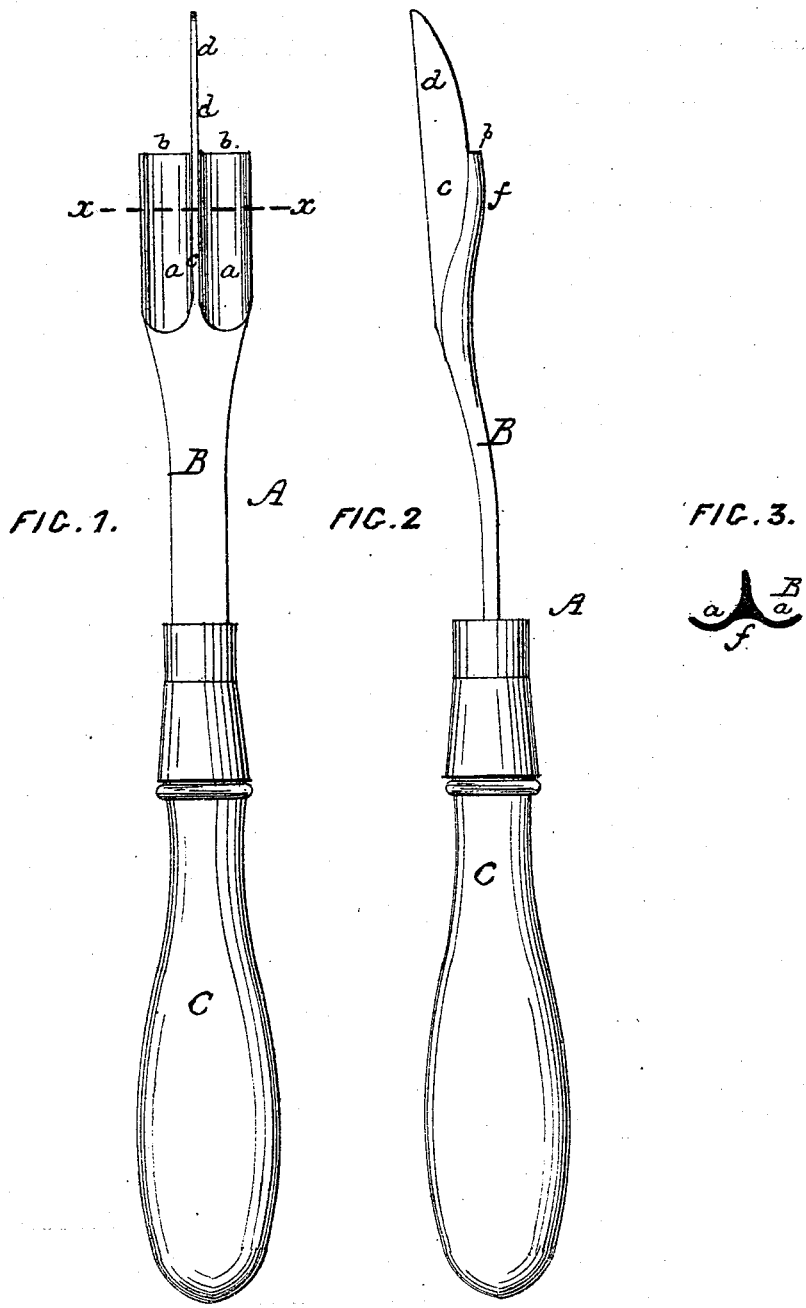
WITNESSES.
Fannie M. Brown.
J. P. McElroy.
INVENTOR.
William H. Wilson
per
Brown Brothers
Attorneys.

UNITED STATES PATENT OFFICE.

WILLIAM H. WILSON, OF BOSTON, MASSACHUSETTS.

IMPROVEMENT IN HAND CORN-SHELLERS.

Specification forming part of Letters Patent No. 123,319, dated January 30, 1872.

*To all persons to whom these presents shall come:*

Be it known that I, WILLIAM H. WILSON, of Boston, in the county of Suffolk and State of Massachusetts, have invented a new and Improved Implement for Shelling Corn, and that the following, reference being had to the accompanying plate of drawing, is a full, clear, and exact description thereof.

This invention relates to an implement or tool more especially designed for shelling boiled green corn; but it can be used for shelling dried corn and green corn not boiled. The tool is constructed substantially of a shank, terminating at one end in a cross-cutting or severing-blade or edge having a forward-projecting prong.

In the accompanying plate of drawing my improved corn-shelling tool is illustrated, Figure 1 being a plan view and Fig. 2 an edge view, and Fig. 3 a cross-section in plane of line $x\ x$, Fig. 1.

A in the drawing represents my improved tool, of which B is the shank, attached to a handle, c, for convenience in using it. The shank B, from end to end, as shown in Fig. 1 more particularly, is of a curve shape, and at its outer end, for a portion of its length, is made broad, with its upper face provided with two parallel longitudinal corrugations or grooves, a, terminating in a fine or thin edge, b. Between the grooves a and separating the same is a raised flange, c, that extends beyond the edges b of grooves a, forming a prong, d, the end and lower edge of which are slightly rounded off. The central portion f of the under side of shank B is slightly concaved, as shown in Fig. 3, for a portion of the length of the shank B.

To use a tool constructed as described, take an ear of corn in one hand and by the other place the prong d of tool at one end of the ear of corn between the dividing line of any two rows of its kernels and push or force the tool along the length of the ear. The prong d serves to guide the tool, while, by the thin edge b, the kernels of corn are removed, or, in other words, the corn shelled along the rows where the tool is forced. The concave bottom f of the shank B permits the cutting or severing-edges to act or cut the more closely to the cob, and therefore it is deemed preferable to so construct the tool; but the tool may be made flat or convex. In lieu of concave cutting-edges they may be made straight; but concave edges are preferable; and in lieu of two cutting or severing-edges one will answer, but two are preferable.

It is plainly apparent that my improved corn-shelling implement is not only simple, but most efficacious and desirable, and that by it corn can be shelled with the utmost convenience, despatch, and in a manner to remove the "meat" of the ear without the waste of hardly a particle.

Having thus described my invention, I shall state my claim as follows:

1. A corn-shelling tool constructed with a cutting-blade, b, either upon one or both sides of a prong, d, substantially as and for the purpose described.

2. I also claim, in combination with the above, the concavity f, substantially as described, for the purpose specified.

The above specification of my improved tool for shelling corn signed by me this 31st day of July, 1871.

WM. H. WILSON.

Witnesses:
ALBERT W. BROWN,
FANNIE M. BROWN.